United States Patent
Park et al.

(10) Patent No.: US 10,719,183 B2
(45) Date of Patent: *Jul. 21, 2020

(54) METHOD OF DETECTING TOUCH INPUT, APPARATUS FOR SENSING TOUCH INPUT, AND APPARATUS FOR INPUTTING TOUCH INPUT

(71) Applicant: SAMSUNG ELECTRONICS CO., LTD., Suwon-si (KR)

(72) Inventors: Sung-soo Park, Suwon-si (KR); Byung-hoon Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,175

(22) Filed: Dec. 20, 2017

(65) Prior Publication Data

US 2018/0113538 A1    Apr. 26, 2018

Related U.S. Application Data

(63) Continuation of application No. 14/700,932, filed on Apr. 30, 2015, now Pat. No. 9,864,475.

(30) Foreign Application Priority Data

Apr. 30, 2014  (KR) .................. 10-2014-0052982

(51) Int. Cl.
*G06F 3/046*   (2006.01)
*G06F 3/041*   (2006.01)
(Continued)

(52) U.S. Cl.
CPC .......... *G06F 3/046* (2013.01); *G06F 3/03545* (2013.01); *G06F 3/0414* (2013.01);
(Continued)

(58) Field of Classification Search
CPC .... G06F 3/046; G06F 3/03545; G06F 3/0414; G06F 3/0416; G09G 5/003
(Continued)

(56) References Cited

U.S. PATENT DOCUMENTS

| 4,827,084 A | * | 5/1989 | Yaniv | ............ G06F 3/033 101/485 |
|---|---|---|---|---|
| 5,028,991 A | | 7/1991 | Sekizawa | |

(Continued)

FOREIGN PATENT DOCUMENTS

| CN | 102129324 A | 7/2011 |
|---|---|---|
| CN | 103593099 A | 2/2014 |

(Continued)

OTHER PUBLICATIONS

Communication dated Nov. 6, 2017, issued by the European Patent Office in counterpart European Application No. 15785883.8.

(Continued)

*Primary Examiner* — Prabodh M Dharia
(74) *Attorney, Agent, or Firm* — Sughrue Mion, PLLC

(57) ABSTRACT

A method of detecting an input of an input marking apparatus includes generating and outputting a number signal to be written to the input marking apparatus, detecting the input marking apparatus in which the number signal is written, by detecting a response signal output from the input marking apparatus, and detecting a position of the input of the input marking apparatus of which the response signal is detected.

24 Claims, 15 Drawing Sheets

(51) Int. Cl.
*G09G 5/00* (2006.01)
*G06F 3/0354* (2013.01)

(52) U.S. Cl.
CPC ........... *G06F 3/0416* (2013.01); *G09G 5/003* (2013.01); *G06F 2203/04104* (2013.01); *G09G 2370/16* (2013.01)

(58) Field of Classification Search
USPC ................................ 345/173–184; 178/18.01
See application file for complete search history.

(56) References Cited

U.S. PATENT DOCUMENTS

| | | | |
|---|---|---|---|
| 5,679,930 A | 10/1997 | Katrusahira | |
| 6,005,555 A | 12/1999 | Katsurahira et al. | |
| 6,654,008 B2 | 11/2003 | Ikeda | |
| 6,744,762 B1* | 6/2004 | Hojo | H04L 47/10 370/392 |
| 6,919,892 B1 | 7/2005 | Cheiky | |
| 7,646,379 B1 | 1/2010 | Drennan et al. | |
| 8,089,008 B2 | 1/2012 | Katsurahira | |
| 9,189,087 B2 | 11/2015 | Kim | |
| 9,658,705 B2 | 5/2017 | Xiang et al. | |
| 2004/0024935 A1* | 2/2004 | Fujiwara | G05B 19/05 710/52 |
| 2006/0001654 A1 | 1/2006 | Smits | |
| 2006/0269217 A1 | 11/2006 | Shirota | |
| 2007/0044136 A1* | 2/2007 | Oshima | H04N 21/235 725/135 |
| 2008/0076410 A1* | 3/2008 | Beyer | H04M 1/72572 455/425 |
| 2008/0238885 A1 | 10/2008 | Zachut et al. | |
| 2009/0078745 A1 | 3/2009 | Wong | |
| 2009/0158162 A1 | 6/2009 | Imai | |
| 2009/0172777 A1 | 7/2009 | Hansen | |
| 2010/0007665 A1 | 1/2010 | Smith | |
| 2010/0079414 A1 | 4/2010 | Ferlitsch | |
| 2012/0013555 A1 | 1/2012 | Maeda et al. | |
| 2012/0044143 A1* | 2/2012 | Newton | G06F 1/1616 345/161 |
| 2012/0075234 A1 | 3/2012 | Yi et al. | |
| 2012/0105362 A1 | 5/2012 | Kremin | |
| 2012/0146944 A1 | 6/2012 | Lee et al. | |
| 2012/0182254 A1 | 7/2012 | Jang | |
| 2012/0188193 A1 | 7/2012 | Saito | |
| 2012/0242603 A1 | 9/2012 | Engelhardt et al. | |
| 2013/0272729 A1 | 10/2013 | Kato | |
| 2013/0342499 A1 | 12/2013 | Chang | |
| 2014/0043283 A1 | 2/2014 | Kim | |
| 2014/0168177 A1 | 6/2014 | Mkrtchyan | |
| 2014/0253462 A1 | 9/2014 | Hicks | |
| 2014/0298375 A1* | 10/2014 | Isozaki | H04N 21/25816 725/30 |
| 2014/0313147 A1* | 10/2014 | Joe | G06F 3/041 345/173 |
| 2015/0002425 A1 | 1/2015 | Lee | |
| 2015/0070296 A1 | 3/2015 | Kuo | |
| 2016/0002014 A1* | 1/2016 | De Jong | B66F 3/46 254/89 R |
| 2016/0061957 A1* | 3/2016 | Li | G01S 19/47 342/357.42 |
| 2016/0152454 A1* | 6/2016 | Stapensea | B66F 3/46 700/213 |
| 2016/0317823 A1* | 11/2016 | Dimas | A61N 1/37229 |
| 2016/0364091 A1* | 12/2016 | Bernstein | G06F 3/03545 |
| 2017/0131798 A1 | 5/2017 | Geaghan | |
| 2017/0153763 A1* | 6/2017 | Vavra | G06F 3/0488 |
| 2017/0174484 A1* | 6/2017 | Van Houten | B66F 3/46 |
| 2018/0032165 A1* | 2/2018 | Rebeschi | G06F 3/03545 |

FOREIGN PATENT DOCUMENTS

| | | |
|---|---|---|
| CN | 103677339 A | 3/2014 |
| EP | 0737933 A1 | 10/1996 |
| KR | 10-2011-0021219 A | 3/2011 |
| KR | 10-2011-0072619 A | 6/2011 |

OTHER PUBLICATIONS

International Search Report dated Jul. 24, 2015 issued by International Searching Authority in counterpart International Application No. PCT/KR2015/004383.

Written Opinion dated Jul. 24, 2015 issued by International Searching Authority in counterpart International Application No. PCT/KR2015/004383.

Communication dated Jan. 9, 2019, issued by the State Intellectual Property Office of P.R. China in counterpart Chinese Application No. 201580023562.0.

* cited by examiner

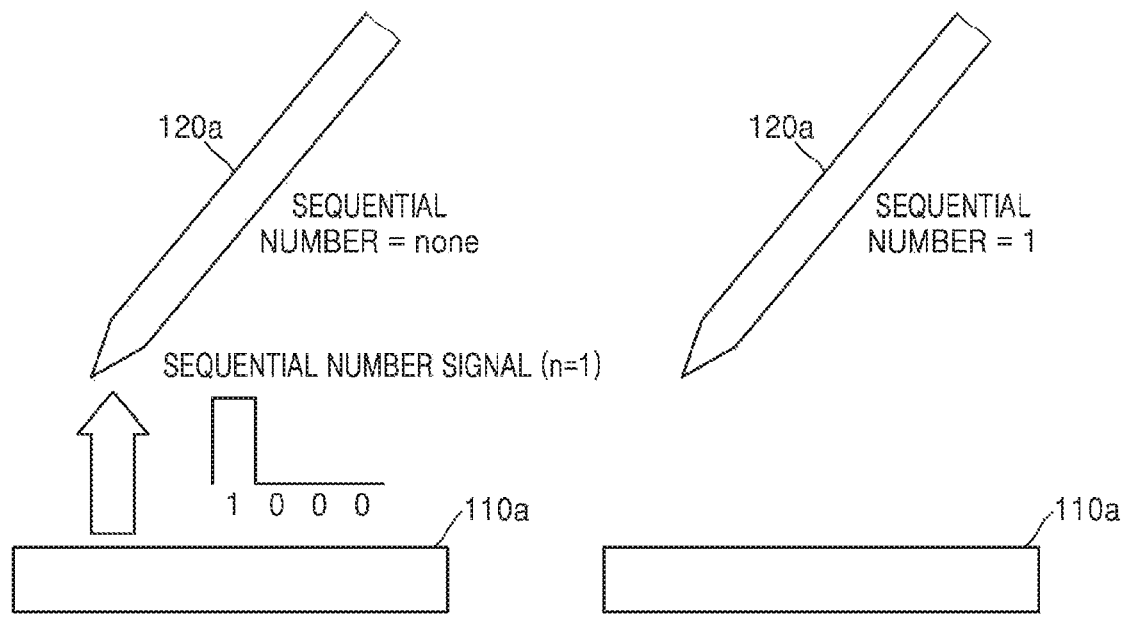
FIG. 4A
FIG. 4B
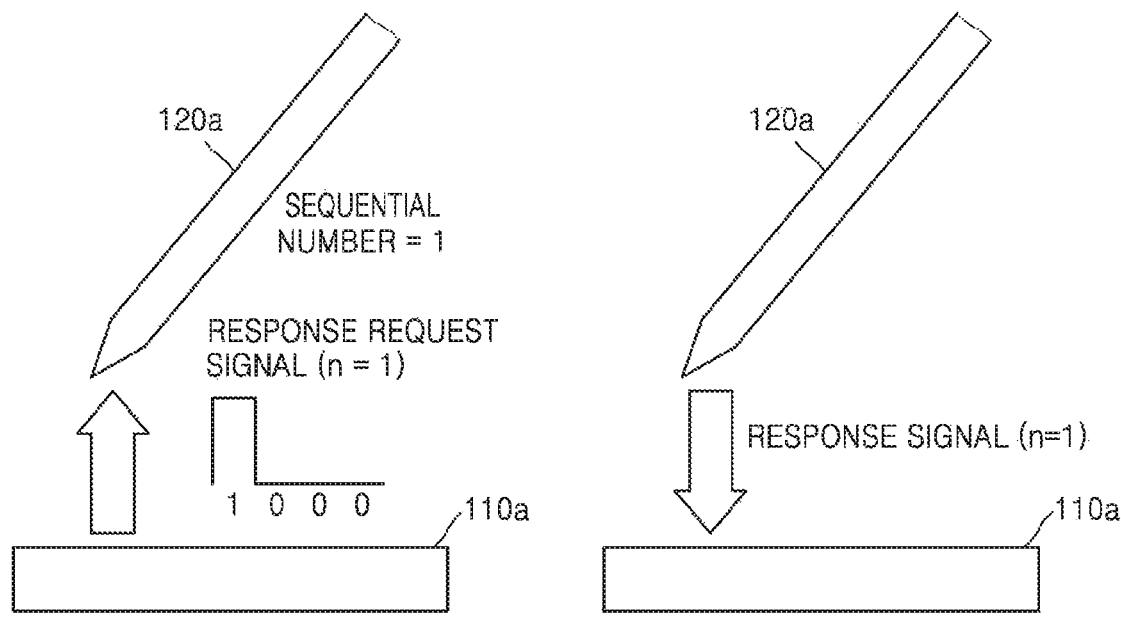
FIG. 5A
FIG. 5B

METHOD OF DETECTING TOUCH INPUT, APPARATUS FOR SENSING TOUCH INPUT, AND APPARATUS FOR INPUTTING TOUCH INPUT

CROSS-REFERENCE TO RELATED APPLICATION

This application is a Continuation Application of U.S. application Ser. No. 14/700,932, filed Apr. 30, 2015, which claims the benefit of Korean Patent Application No. 10-2014-0052982, filed on Apr. 30, 2014, in the Korean Intellectual Property Office, the disclosure of which is incorporated herein in its entirety by reference.

BACKGROUND

1. Field

Methods and apparatuses consistent with exemplary embodiments relate to a method for detecting a touch input, an apparatus for sensing a touch input, and an apparatus for inputting a touch input.

2. Description of the Related Art

Electronic apparatuses providing various functions like tablet personal computers (PCs), smartphones, or personal digital assistants (PDAs) are becoming increasingly popular in the consumer market. Since electronic apparatuses provide various functions such as a wireless internet function, an electronic organizer function, a multimedia content reproduction function, a photographing function, or a game function, more data input devices are required. Additionally, a touch screen incorporating an input device and a display device in one body is widely employed in various electronic apparatuses. A touch screen may include a capacitive overlay type, a resistive overlay type, a surface acoustic wave type, a transmitter type, and an infrared beam type. With the spread of touch screens, an electronic apparatus capable of various touch inputs is required.

SUMMARY

One or more exemplary embodiments of the present inventive concept include an apparatus for sensing a touch input and a method of detecting a touch input, by which touch inputs from a plurality of apparatuses for inputting a touch input may be received.

One or more exemplary embodiments of the present inventive concept include an apparatus for inputting a touch input which may receive a touch input with another apparatus for inputting a touch input.

Additional aspects will be set forth in part in the description which follows and, in part, will be apparent from the description, or may be learned by practice of the presented exemplary embodiments.

According to one or more exemplary embodiments of the present inventive concept, a method of detecting an input of an input marking apparatus includes generating and outputting a number signal to be written to the input marking apparatus, detecting the input marking apparatus in which the number signal is written, by detecting a response signal output from the input marking apparatus, and detecting a position of the input of the input marking apparatus of which the response signal is detected.

The position of the input may be detected by using an antenna that detects a resonance signal. The method may further include changing a drive axis of an antenna drive signal when a distance between a plurality of input marking apparatuses is less than a reference value.

The position of the input may be detected by using an antenna that detects a resonance signal. The method may further include changing a drive sequence of an antenna drive signal when a distance between a plurality of input marking apparatuses is less than a reference value.

In the detecting of the input marking apparatus, after the number signal is output, the input marking apparatus may be detected by detecting a number acceptance signal with respect to the number signal.

The detecting of the touch-input marking apparatus may include generating and outputting a response request signal with respect to the number signal after the number signal is output, and detecting the input marking apparatus by detecting a response signal with respect to the response request signal.

The method may further include generating and outputting a pen pressure request signal that requests information about a pen pressure with respect to an input marking apparatus associated with a particular number, and acquiring the information related to a pen pressure of the input marking apparatus associated with the particular number by receiving a pen pressure signal output by the input marking apparatus corresponding to the particular number.

The method may further include generating and outputting additional information request signal that requests additional information with respect to an input marking apparatus associated with a particular number, and acquiring the additional information of the input marking apparatus related to the particular sequential number by receiving an additional information signal output by the input marking apparatus corresponding to the particular number.

The additional information may include information about a state of a button provided in the input marking apparatus.

The method may further include determining a delay between a response request signal and a response signal according to the number signal written to the touch-input marking apparatus.

The detecting of a position of a touch-input of the input marking apparatus may include detecting a response signal from at least two input marking apparatuses respectively associated with at least two numbers; and if paths of touch inputs of the at least two input marking apparatuses cross each other, detecting positions of the touch inputs of the at least two input marking apparatuses of which paths cross each other.

According to one or more exemplary embodiments of the present inventive concept, an apparatus for sensing an input of an input marking apparatus includes an antenna which is configured to receive a signal from the input marking apparatus and detect the position of an input of the input marking apparatus, and an input sensing apparatus controller which is configured to generate and output a number signal to be written to the input marking apparatus, detect the input marking apparatus where the number signal is written, by receiving a response signal output from the input marking apparatus, and acquire information about a position of a touch input of the input marking apparatus of which the response signal is detected, by using the antenna.

The input sensing apparatus controller may change a drive axis of an antenna drive signal when a distance between a plurality of input marking apparatuses is less than a reference value.

The input sensing apparatus controller may change a drive sequence of an antenna drive signal when a distance between a plurality of input marking apparatuses is less than a reference value.

After the number signal is output, the input sensing apparatus controller may detect the input marking apparatus by detecting a number acceptance signal with respect to the number signal.

The input sensing apparatus controller may acquire the information about a position of the input marking apparatus by generating and outputting a response request signal with respect to the number signal after the number signal is output, and detecting a response signal with respect to the response request signal.

The touch-input sensing apparatus controller may generate and output a pen pressure request signal that requests information about a pen pressure with respect to an input marking apparatus associated with a particular sequential number, and acquire the information about a pen pressure of the touch-input marking apparatus associated with the particular number by receiving a pen pressure signal output by the input marking apparatus corresponding to the particular number.

The input marking apparatus may change a state function of the input marking apparatus according to the sequential number signal transmitted by the input sensing apparatus controller and determine the response signal according to a combination of the state function and the response request signal transmitted by the input sensing apparatus.

The input sensing apparatus controller may generate and output an additional information request signal that requests additional information with respect to an input marking apparatus associated with a particular number, and acquire the additional information of the input marking apparatus associated with the particular number by receiving an additional information signal output by the input marking apparatus corresponding to the particular number.

The additional information may include information about a state of a button provided in the input marking apparatus.

A delay between a response request signal and a response signal may be determined according to the number signal written to the input marking apparatus.

The input sensing apparatus controller may detect positions of at least two inputs by tracking positions of the at least two inputs of at least two input marking apparatuses of which response signals are detected when paths of the at least two inputs of the at least two input marking apparatuses cross each other.

According to one or more exemplary embodiments of the present inventive concept, an apparatus for marking an input includes a storage which is configured to store a number signal output by an input sensing apparatus, an input marking apparatus controller which is configured to generate and output a response signal according to a response request signal and the number signal output by the input sensing apparatus, and a resonance signal outputter which is configured to generate and output a resonance signal.

The input sensing apparatus controller may determine a delay between the response request signal and the response signal according to the number signal.

When the response request signal is detected and a reference time passes, the input marking apparatus controller may erase the number signal stored in the storage.

When the number signal is input, the input marking apparatus control unit generates and outputs a number acceptance signal.

The apparatus may further include a pen pressure detector which is configured to detect a pen pressure of the input marking apparatus, in which, when a pen pressure request signal that requests information about a pen pressure corresponding to a number of the input marking apparatus is received, the input marking apparatus controller outputs a pen pressure signal including information about a pen pressure.

The storage may store additional information about the input marking apparatus, and when the additional information request signal that requests additional information corresponding to a number of the input marking apparatus is received, the input sensing apparatus control unit may output an additional information signal including the additional information.

The input marking apparatus may include a button for setting a state of the input marking apparatus, and the additional information may include information about a state of the button.

BRIEF DESCRIPTION OF THE DRAWINGS

These and/or other aspects will become apparent and more readily appreciated from the following description of the exemplary embodiments, taken in conjunction with the accompanying drawings in which:

FIGS. 4A and 4B illustrate a process of allotting a sequential number to the touch-input marking apparatus;

FIGS. 5A and 5B illustrate a process of detecting the touch-input marking apparatus;

DETAILED DESCRIPTION

Figure 1:
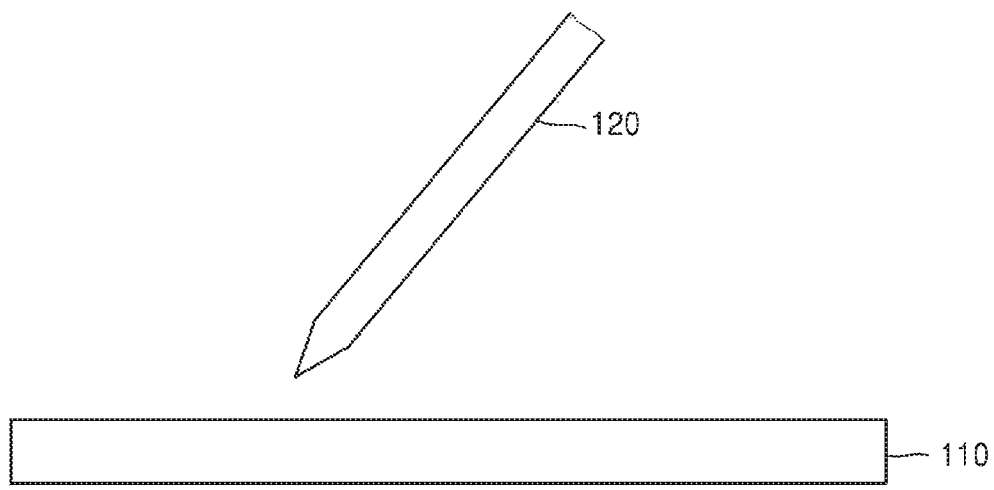
FIG. 1 illustrates a touch-input sensing apparatus and a touch-input marking apparatus according to an exemplary embodiment.

Reference will now be made in detail to embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a touch-input sensing apparatus 110 and a touch-input marking apparatus 120 according to an exemplary embodiment.

The touch-input sensing apparatus 110 is an electronic apparatus that may detect a touch input. The touch-input sensing apparatus 110 may include a display unit that is embodied in the form of, for example, a touch screen. The touch-input sensing apparatus 110 may be embodied in various forms, for example, a tablet personal computer (PC), a smartphone, a personal digital assistant (PDA), a camera, a touch monitor, etc.

The touch-input marking apparatus 120 provides a touch input to the touch-input sensing apparatus 110 through a contact with a touch screen of the touch-input sensing apparatus 110. The touch-input marking apparatus 120 may be embodied in the form of, for example, a touch pen, an instrument having a predetermined shape, etc. The touch-input marking apparatus 120 may include a resonance circuit that outputs a resonance signal.

Figure 2:
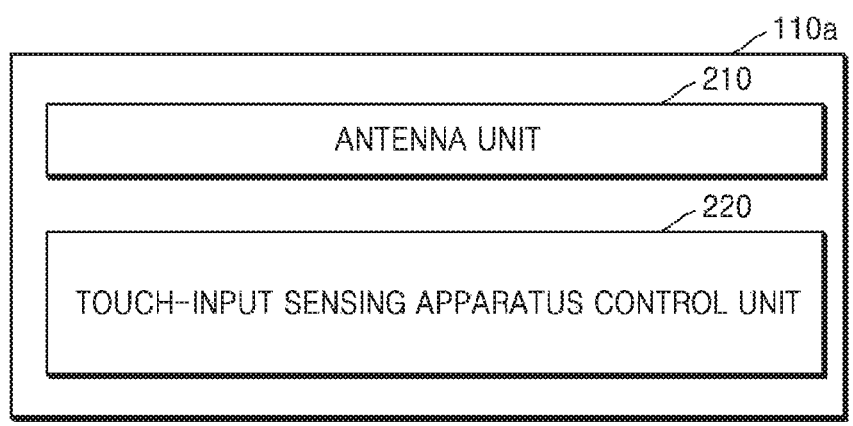
FIG. 2 is a block diagram illustrating a structure of a touch-input sensing apparatus according to an exemplary embodiment.

FIG. 2 is a block diagram illustrating a structure of a touch-input sensing apparatus 110a according to an exemplary embodiment. The touch-input sensing apparatus 110a according to the present exemplary embodiment may include an antenna unit 210 ("antenna") and a touch-input sensing apparatus control unit 220 ("touch-input sensing apparatus controller").

The antenna unit 210 detects a touch input from the touch-input marking apparatus 120 and a position thereof. The antenna unit 210 may detect a touch input and a position thereof by transceiving a resonance signal with the touch-input marking apparatus 120.

The touch-input sensing apparatus control unit 220 controls an overall operation of the touch-input sensing apparatus 110a.

The touch-input sensing apparatus control unit 220 generates and outputs a sequential number signal to allot a sequential number to the touch-input marking apparatus 120. According to an exemplary embodiment, a sequential number signal may be transmitted to the touch-input marking apparatus 120 through the antenna unit 210 or by using a communication module separately provided in the touch-input sensing apparatus 110a. The touch-input sensing apparatus control unit 220 outputs the sequential number signal including sequential number information, to the touch-input marking apparatus 120 to write the sequential number to the touch-input marking apparatus 120.

Also, the touch-input sensing apparatus control unit 220 detects the touch-input marking apparatus 120 corresponding to each of the sequential numbers. For example, the touch-input sensing apparatus control unit 220 may request a response signal from the touch-input marking apparatus 120 and receive the response signal from the touch-input marking apparatus 120, thereby detecting the touch-input marking apparatus 120 of each sequential number.

According to an exemplary embodiment, the touch-input sensing apparatus control unit 220 outputs a resonance signal to the touch-input marking apparatus 120 through the antenna unit 210, receives a response signal from the touch-input marking apparatus 120, and exchanges a signal with the touch-input marking apparatus 120 by using the received response signal, thereby detecting the touch-input marking apparatus 120.

According to the present exemplary embodiment, the touch-input sensing apparatus control unit 220 generates a response request signal including sequential number information and outputs a generated response request signal to the touch-input marking apparatus 120. The response request signal is a signal requesting a response signal from the touch-input marking apparatus 120 to which a sequential number is allotted. The touch-input sensing apparatus control unit 220 may generate and output response request signals corresponding to the sequential numbers to which sequential number signals are output. For example, when the touch-input sensing apparatus control unit 220 outputs sequential number signals of sequential numbers 1, 2, and 3 the touch-input sensing apparatus control unit 220 may generate and output response request signals associated with sequential numbers 1, 2, and 3. Also, the touch-input sensing apparatus control unit 220 detects a response signal that is generated and output by the touch-input marking apparatus 120 in response to the response request signal. The touch-input sensing apparatus control unit 220 may transmit a response request signal or receive a response signal through the antenna unit 210. Also, the touch-input sensing apparatus control unit 220 may include a comparison circuit to determine a value of the response request signal.

According to an exemplary embodiment, the touch-input sensing apparatus control unit 220 may determine a response signal detected within a predetermined time from when the response request signal is output, as a response signal corresponding to the sequential number of the response request signal.

According to another exemplary embodiment, the response signal includes sequential number information and the touch-input sensing apparatus control unit 220 may determine the sequential number of the touch-input marking apparatus 120 that outputs the response signal by using the sequential number information included in the response signal.

For the sequential number of a finally output sequential number signal, when the touch-input sensing apparatus control unit 220 detects the touch-input marking apparatus 120 of the corresponding sequential number, the touch-input sensing apparatus control unit 220 generates and output a sequential number signal of the next sequential number. According to an exemplary embodiment, the touch-input sensing apparatus control unit 220 may control a position of a touch input to be detected only when a response signal is detected from the antenna unit 210.

Figure 3:
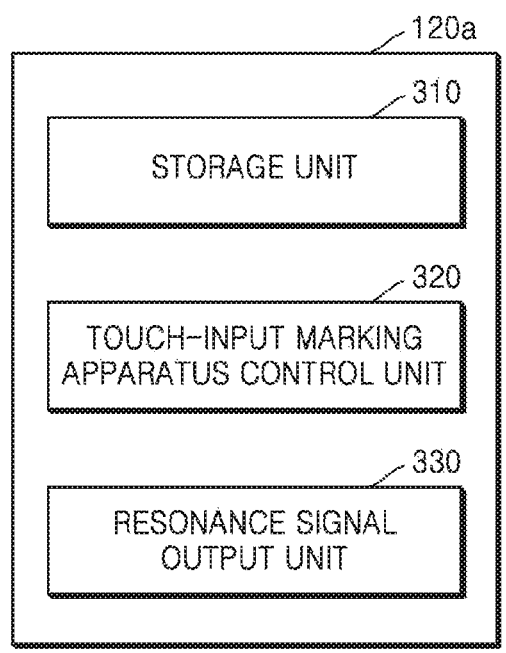
FIG. 3 is a block diagram illustrating a structure of a touch-input marking apparatus according to an exemplary embodiment.

FIG. 3 is a block diagram illustrating a structure of a touch-input marking apparatus 120a according to an exemplary embodiment. According to the present exemplary embodiment, the touch-input marking apparatus 120a may include a storage unit 310 ("storage"), a touch-input marking apparatus control unit 320 ("touch-input marking apparatus controller"), and a resonance signal output unit 330 ("resonance signal outputter").

The storage unit 310 stores sequential numbers. The storage unit 310 may be embodied by a predetermined storage medium that may store data.

The touch-input marking apparatus control unit 320 controls an overall operation of the touch-input marking apparatus 120a.

The resonance signal output unit 330 outputs a resonance signal. The touch-input marking apparatus 120a may notify a position thereof by outputting a resonance signal. The touch-input sensing apparatus 110a may detect a position of the touch-input marking apparatus 120a by detecting the resonance signal output from the resonance signal output unit 330.

When receiving a sequential number, the touch-input marking apparatus control unit 320 stores the received sequential number in the storage unit 310. According to an exemplary embodiment, even when a sequential number is received, if the received sequential number is already allotted to the storage unit 310, the touch-input marking apparatus control unit 320 may not store the received sequential number in the storage unit 310.

According to an exemplary embodiment, the sequential number may be received by using a predetermined antenna or a communication module provided in the touch-input marking apparatus 120a. The antenna may be separately provided or provided in the resonance signal output unit 330.

According to an exemplary embodiment, when a predetermined time passes after a sequential number signal is stored in the storage unit 310, the touch-input marking apparatus control unit 320 may erase the sequential number signal from the storage unit 310 or invalidate the sequential number signal. According to the present exemplary embodiment, while a sequential number is allotted to the touch-input marking apparatus 120a and the touch-input marking apparatus 120a generates a touch input, if the touch-input marking apparatus 120a is not used for a predetermined time, the allot sequential number is invalided or erased and thus the touch-input marking apparatus 120a may be used in another touch-input sensing apparatus 110a or may be used by allotting a new sequential number.

Also, the touch-input marking apparatus control unit 320 outputs a response signal in response to the response request signal output from the touch-input sensing apparatus 110a. The response request signal may be received by using a communication module provided in the touch-input marking apparatus 120a or an antenna provided in the resonance signal output unit 330. The touch-input marking apparatus control unit 320 may output or may not output a response signal according to a combination of the sequential number signal stored in the storage unit 310 and the received response request signal. For example, when the storage unit 310 stores a sequential number signal of a sequential number 1, the touch-input marking apparatus control unit 320 may output a response signal when a response request signal corresponding to the sequential number 1 is received, or may not output a response signal when a response request signal other than the sequential number 1, for example, a response request signal other than a sequential number 2, is received.

According to an exemplary embodiment, the touch-input marking apparatus control unit 320 may adjust a delay between the response request signal and the response signal according to the sequential number.

The resonance signal output unit 330 may generate or output a resonance signal. The touch-input sensing apparatus 110a may detect a touch position of the touch-input marking apparatus 120a by detecting the resonance signal. The resonance signal output unit 330 may receive the resonance signal from the antenna unit 210 or output the resonance signal through the antenna unit.

FIGS. 4A and 4B illustrate a process of allotting a sequential number to the touch-input marking apparatus 120a.

The touch-input marking apparatus 120a in a state of not being allotted with a sequential number may access the touch-input sensing apparatus 110a. The touch-input sensing apparatus 110a may generate a sequential number signal corresponding to the sequential number 1, as illustrated in FIG. 4A, and allot the sequential number 1 to the touch-input marking apparatus 120a, as illustrated in FIG. 4B.

FIGS. 5A and 5B illustrate a process of detecting the touch-input marking apparatus 120a.

The touch-input sensing apparatus 110a may detect the touch-input marking apparatus 120a by using a response request signal. For example, the touch-input sensing apparatus 110a outputs a response request signal corresponding to the sequential number 1 as illustrated in FIG. 5A. When detecting a response signal, the touch-input sensing apparatus 110a may recognize that the touch-input marking apparatus 120a corresponding to the sequential number 1 is in use.

Figure 6A:
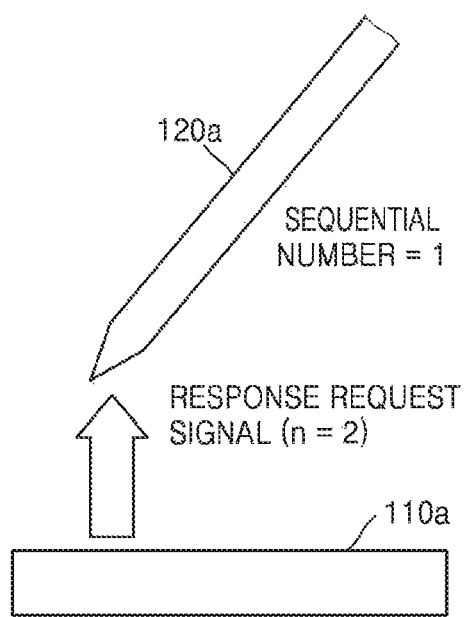
FIGS. 6A and 6B illustrate a process of detecting the touch-input marking apparatus.
Figure 6B:
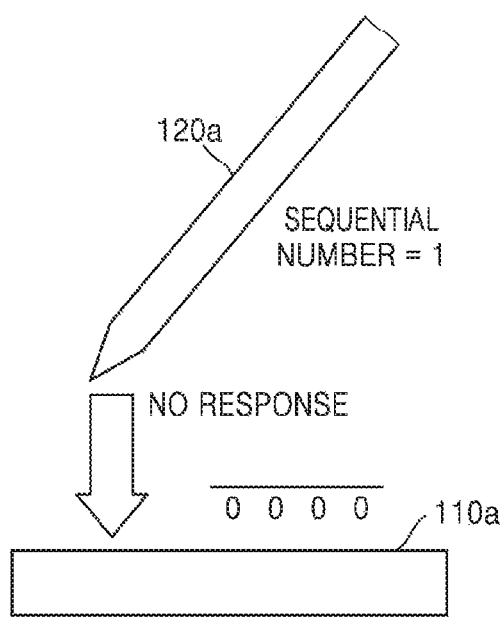

FIGS. 6A and 6B illustrate a process of detecting the touch-input marking apparatus 120a.

As illustrated in FIG. 6A, when the touch-input sensing apparatus 110a outputs a response request signal corresponding to a sequential number 2, the touch-input marking apparatus 120a corresponding to the sequential number 1 does not output a response signal to the response request signal.

The touch-input sensing apparatus 110a may recognize the touch-input sensing apparatus 110a, to which the sequential number is allotted, by detecting the response signal. For example, even when the touch-input sensing apparatus 110a generates and outputs a sequential number signal corresponding to the sequential number 1, the touch-input sensing apparatus 110a may not recognize the touch-input marking apparatus 120a to which the sequential number 1 is allotted, until a response signal corresponding to the sequential number 1 is detected. However, when the touch-input sensing apparatus 110a detects a response signal corresponding to the sequential number 1, the touch-input sensing apparatus 110a may recognize the touch-input marking apparatus 120a to which the sequential number 1 is allotted. When the touch-input sensing apparatus control unit 220 of the touch-input sensing apparatus 110*a* detects a response signal corresponding to the sequential number 1, the touch-input sensing apparatus control unit 220 generates and outputs a sequential number signal corresponding to the sequential number 2 that is a next sequential number.

The touch-input sensing apparatus 110*a* may sense the touch-input marking apparatus 120*a* corresponding to the sequential number by outputting a response request signal and detecting a response signal. For example, in order to receive a touch input from the touch-input marking apparatus 120*a* corresponding to the sequential number 1, the touch-input sensing apparatus 110*a* outputs a response request signal corresponding to the sequential number 1 and receives a response signal from the touch-input marking apparatus 120*a* associated with the sequential number 1, thereby sensing the touch-input marking apparatus 120*a* associated with the sequential number 1. The touch-input sensing apparatus 110*a* may sequentially and repeatedly sense a plurality of the touch-input marking apparatuses 120*a* by using the response request signal and the response signal.

Figure 7A:
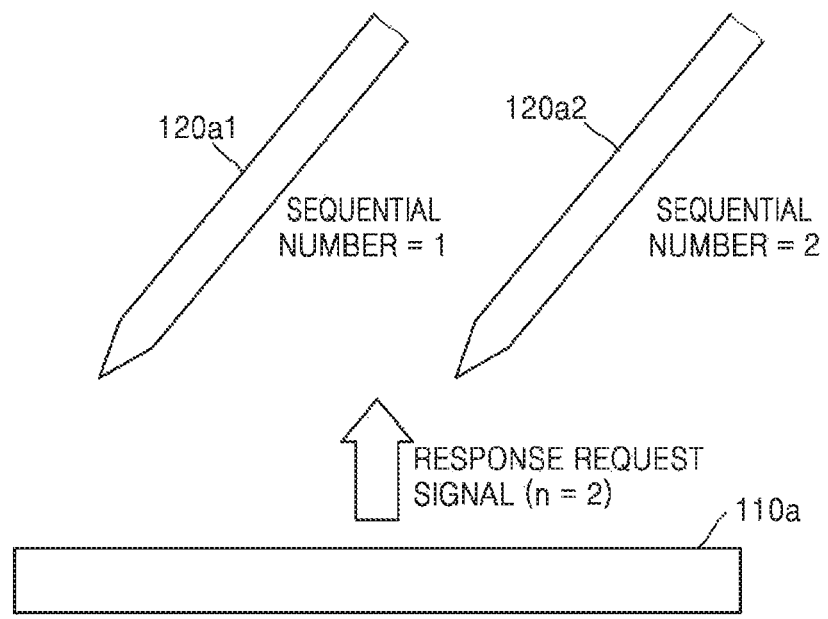
FIGS. 7A and 7B illustrates a method of distinguishing a plurality of touch-input marking apparatuses when the touch-input marking apparatuses provide touch inputs to the touch-input marking apparatus, according to an exemplary embodiment.
Figure 7B:
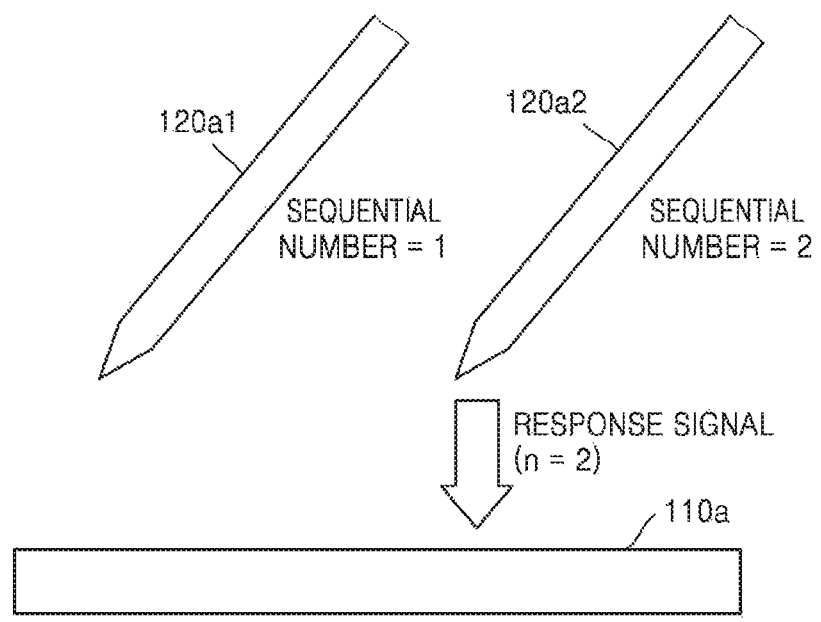

FIGS. 7A and 7B illustrates a method of distinguishing a plurality of touch-input marking apparatuses 120*a*1 and 120*a*2 when the touch-input marking apparatuses 120*a*1 and 120*a*2 provide touch inputs to the touch-input sensing apparatus 110*a*, according to an exemplary embodiment.

When a plurality of the touch-input marking apparatuses 120*a*1 and 120*a*2 are in use, the touch-input sensing apparatus 110*a* may output a response request signal corresponding to a sequential number of the touch-input marking apparatus 120*a*2 of which touch input is to be detected and receive a touch input from the touch-input marking apparatus 120*a*2 of the corresponding sequential number. As illustrated in FIGS. 7A and 7B, when the touch-input sensing apparatus 110*a* outputs a response request signal corresponding to the sequential number 2, only the touch-input marking apparatus 120*a*2 corresponding to the sequential number 2 outputs a response signal, and the touch-input marking apparatus 120*a*1 corresponding to the sequential number 1 does not output a response signal.

According to an exemplary embodiment, the response signal provides the sequential number information of the touch-input marking apparatuses 120*a*1 and 120*a*2 and simultaneously provides information about a position of a touch input through the antenna unit 210 of the touch-input sensing apparatus 110*a*. In this case, the response signal may be a resonance signal output from the resonance signal output unit 330 of the touch-input marking apparatus 120*a*. For example, a method of detecting a position of the touch-input marking apparatus 120*a* of the corresponding sequential number may be used by using the relative amplitude of a response signal received through a plurality of antennas installed in the antenna unit 210.

According to another exemplary embodiment, the resonance signal output unit 330 of the touch-input marking apparatuses 120*a*1 and 120*a*2 may output a resonance signal only when a response request signal of the corresponding sequential number is detected. For example, when the touch-input sensing apparatus 110*a* outputs the response request signal of the sequential number 1, the touch-input marking apparatus 120*a*1 associated with the sequential number 1 outputs a response signal and a resonance signal. The touch-input sensing apparatus control unit 220 of the touch-input sensing apparatus 110*a* may detect a position of a touch input of the touch-input marking apparatus 120*a*1 having the sequential number 1 by outputting the response request signal of the sequential number 1 and by using a resonance signal detected within a predetermined time.

Figure 8:
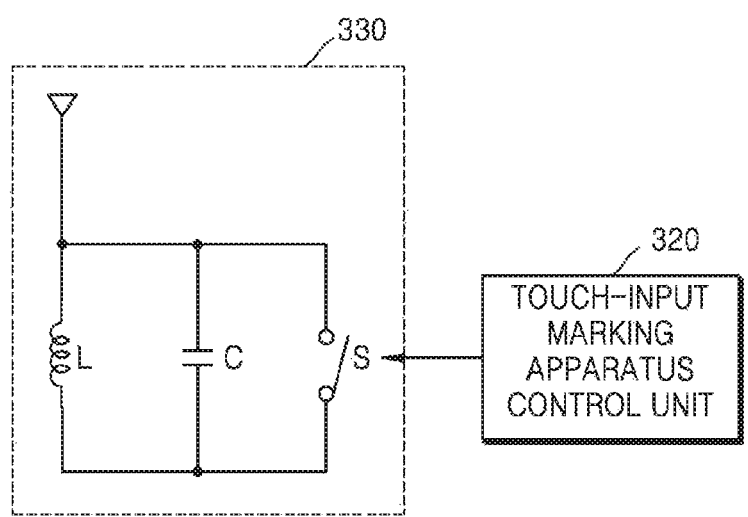
FIG. 8 illustrates structures of a resonance signal output unit and a touch-input marking apparatus control unit according to an exemplary embodiment.

FIG. 8 illustrates structure of the resonance signal output unit 330 and the touch-input marking apparatus control unit 320 according to an exemplary embodiment.

According to the present exemplary embodiment, the resonance signal output unit 330 may include a resonance circuit having an inductor L, a capacitor C, and a switch S which are connected in parallel with respect to an antenna. The switch S is controlled by a control signal output from the touch-input marking apparatus control unit 320. When the switch S is closed, opposite ends of the inductor L and the capacitor C are short-circuited and thus no resonance is generated. The touch-input marking apparatus control unit 320 may control a pattern of the resonance signal by controlling the switch S of the resonance signal output unit 330. For example, the touch-input marking apparatus control unit 320 may control the resonance signal output unit 330 such that the switch S is open to output a response signal and the switch S is closed to prevent the output of a response signal.

According to the present exemplary embodiment, the touch-input marking apparatus 120 may be configured by using passive components. According to the present exemplary embodiment, since the touch-input marking apparatus 120 is configured by using passive components, a structure without a battery is available and thus the weight of an apparatus may be reduced. In this case, the touch-input marking apparatus 120 may generate and output a resonance signal by using the resonance signal transmitted by the touch-input sensing apparatus 110 as an energy source. After transmitting the resonance signal to the touch-input marking apparatus 120, the touch-input sensing apparatus 110 may determine the existence of a response signal by determining whether a resonance signal is generated by the touch-input marking apparatus 120.

Figure 9:
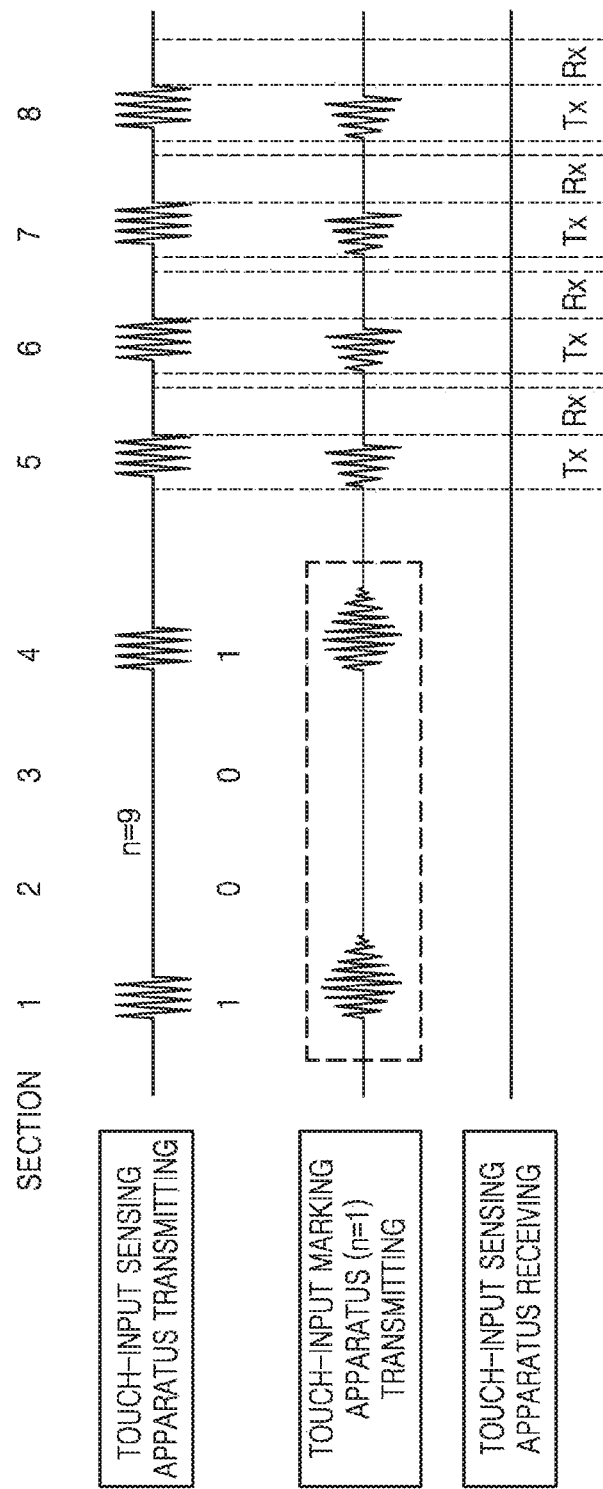
FIG. 9 illustrates an example in which the touch-input sensing apparatus and the touch-input marking apparatus exchange a response request signal and a response signal when a response request signal that does not correspond to a sequential number signal of the touch-input marking apparatus is output, according to an exemplary embodiment.

FIG. 9 illustrates an example in which the touch-input sensing apparatus 110 and the touch-input marking apparatus 120 exchange a response request signal and a response signal when a response request signal that does not correspond to a sequential number signal of the touch-input marking apparatus 120 is output, according to an exemplary embodiment. In FIG. 9, the touch-input sensing apparatus 110 transmits a response request signal, the resonance signal output unit 330 of the touch-input marking apparatus 120 generates and outputs a response signal, and the touch-input sensing apparatus 110 receives the response signal.

FIG. 9 illustrates an example in which the touch-input sensing apparatus 110 outputs a response request signal corresponding to a binary number 1001 in sections 1 to 4 and the touch-input marking apparatus 120 has a sequential number 1. The response request signal corresponding to a binary number 1001 is a response request signal corresponding to a sequential number 9. In this case, the touch-input marking apparatus 120 having the sequential number 1 is not a suitable touch-input marking apparatus, and the switch S is closed thereby terminating the resonance signal. After a signal is generated in a transmission operation Tx of the touch-input sensing apparatus 110, in a receiving operation Rx of the touch-input sensing apparatus 110 in which the touch-input marking apparatus 120 generates a resonance signal, the touch-input marking apparatus 120 closes the switch S of the resonance circuit thereby preventing generation of a resonance signal.

Figure 10:
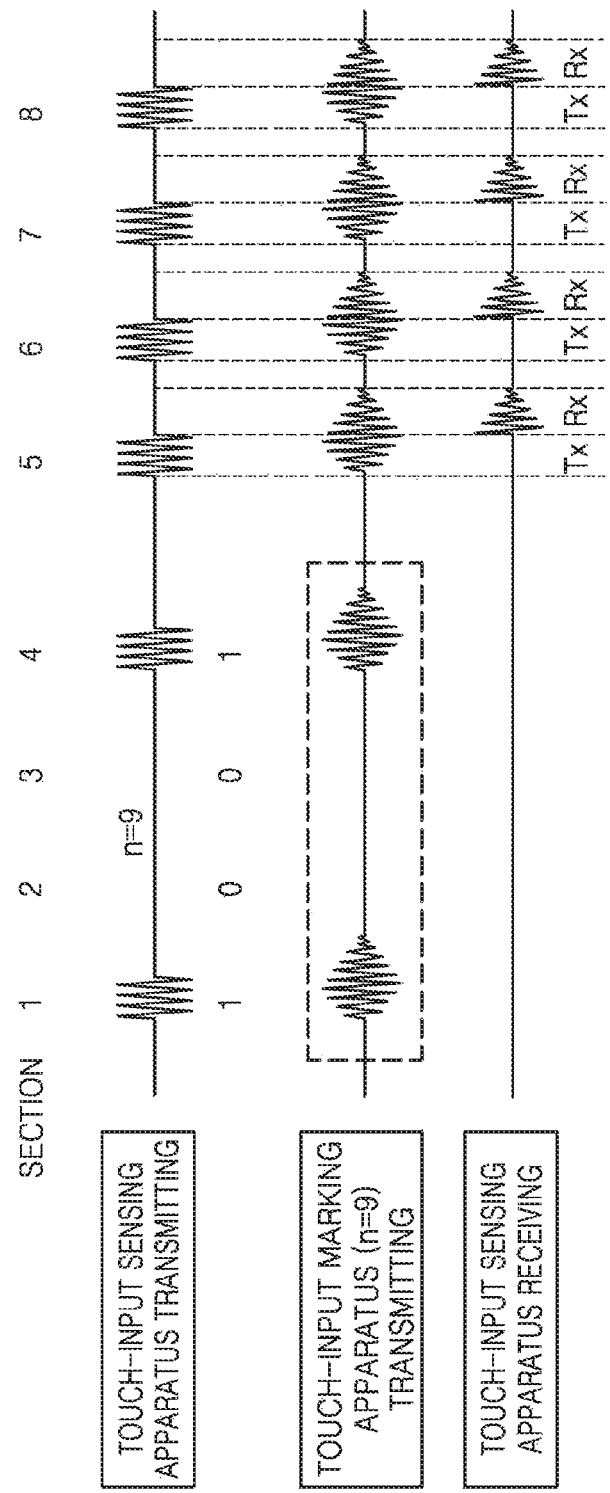
FIG. 10 illustrates an example in which the touch-input sensing apparatus and the touch-input marking apparatus exchange a response request signal and a response signal when a response request signal that corresponds to a sequential number signal of the touch-input marking apparatus is output, according to an exemplary embodiment.

FIG. 10 illustrates an example in which the touch-input sensing apparatus 110 and the touch-input marking apparatus 120 exchange a response request signal and a response signal when a response request signal that corresponds to a sequential number signal of the touch-input marking apparatus 120 is output, according to an exemplary embodiment. In FIG. 10, the touch-input sensing apparatus 110 transmits a response request signal, the resonance signal output unit 330 of the touch-input marking apparatus 120 generates and outputs a response signal, and the touch-input sensing apparatus 110 receives the response signal.

FIG. 10 illustrates an example in which the touch-input sensing apparatus 110 outputs a response request signal corresponding to a binary number 1001 in sections 1 to 4 and the touch-input marking apparatus 120 has a sequential number 1. The response request signal corresponding to a binary number 1001 is a response request signal corresponding to a sequential number 9. In this case, the touch-input marking apparatus 120 having the sequential number 9 is a suitable touch-input marking apparatus, and the switch S is not closed. Accordingly, after a transmission signal is generated in sections 5 to 8, the resonance signal is transmitted and thus the touch-input sensing apparatus 110 receives the resonance signal generated by the touch-input marking apparatus 120.

Figure 11:
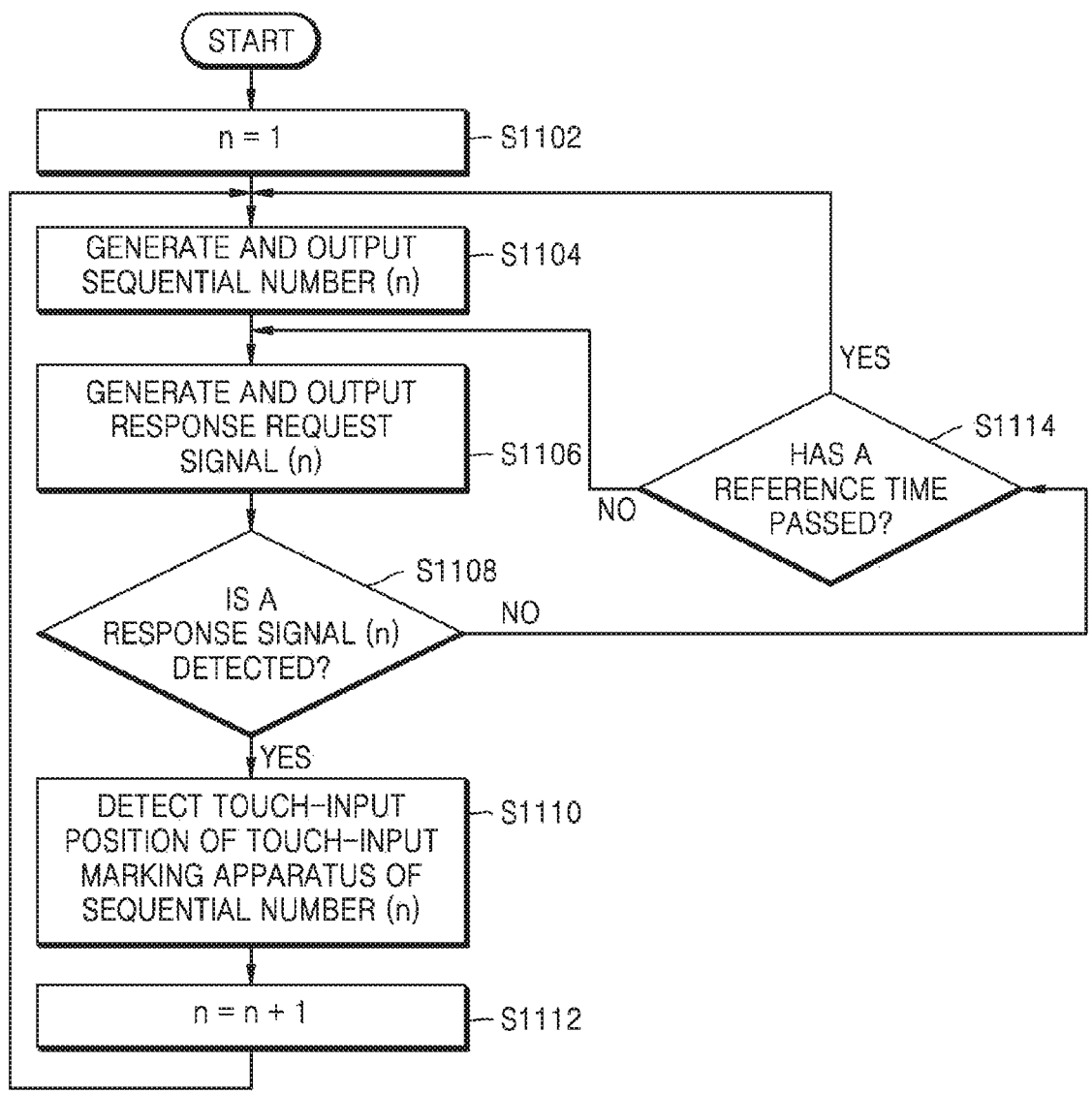
FIG. 11 is a flowchart for explaining a method of detecting a touch input according to an exemplary embodiment.

FIG. 11 is a flowchart for explaining a method of detecting a touch input according to an exemplary embodiment.

First, an initial value of a sequential number of a sequential number signal is set (S1102). For example, the initial value of a sequential number is set to 1 and the sequential number increases by 1 to be sequentially allotted.

Next, the touch-input sensing apparatus 110a generates and outputs a sequential number signal (S1104).

When the sequential number signal is output, a response request signal corresponding to the sequential number is generated and output (S1106). When a response signal to the response request signal is detected (S1108), a touch position of the touch-input marking apparatus 120 corresponding to the sequential number is detected (S1110). An operation of generating and outputting a response request signal (S1106), an operation of detecting a response signal (S1108), and an operation of detecting a touch position (S1112) may be repeatedly performed whenever detection of a touch position is necessary.

Also, a sequential number signal of a next sequential number is generated and output (S1112).

The response request signal, as illustrated in FIG. 11, may be output to detect whether the touch-input marking apparatus 120 is allotted to a corresponding sequential number after the sequential number signal is output. Alternatively, the response request signal may be repeatedly output at a predetermined time point to detect the position of the touch-input marking apparatus 120 after the sequential number is allotted.

If the response signal is not detected (S1108), it is determined whether a predetermined reference time passes after the response request signal is output (S1114). If the predetermined reference time passes, a sequential number signal is generated and output again (S1104). Otherwise, a response request signal is generated and output (S1106).

Figure 12:
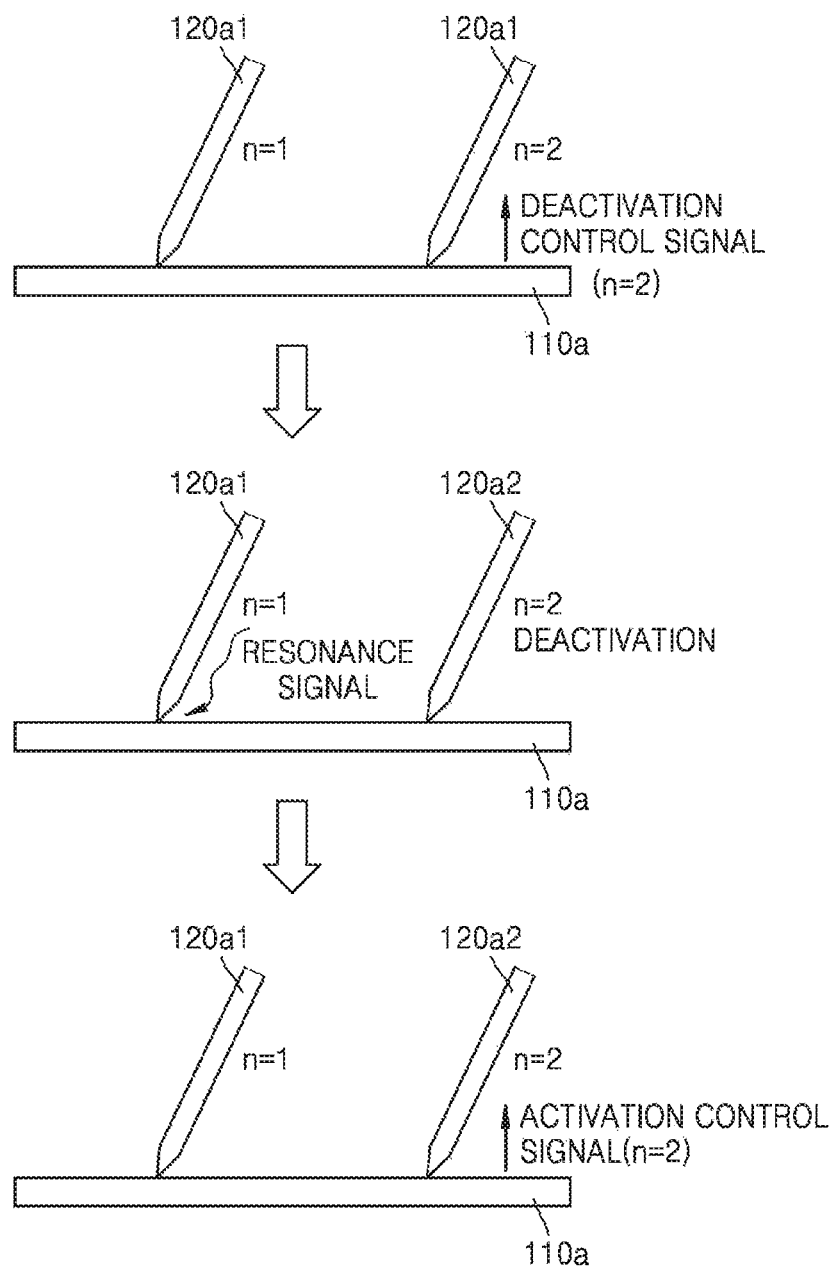
FIG. 12 illustrates a process in which a position detector detects positions of touch inputs of the touch-input marking apparatus according to another exemplary embodiment.

FIG. 12 illustrates a process in which touch-input sensing apparatus 110a detects positions of touch inputs of the touch-input marking apparatuses 120a1 and 120a2 according to another exemplary embodiment.

According to the present exemplary embodiment, in order to detect the positions of the touch inputs of the touch-input marking apparatuses 120a1 and 120a2, the touch-input sensing apparatus may deactivate the touch-input marking apparatus 120a2 rather than the touch-input marking apparatus 120a1, of which touch input is to be detected, and then detect a touch-input position of the touch-input marking apparatus 120a1 and activate the touch-input marking apparatus 120a2 that is deactivated. For example, as illustrated in FIG. 12, in a state in which the touch-input marking apparatus 120a1 associated with the sequential number 1 and the touch-input marking apparatus 120a2 associated with the sequential number 2 are detected, when the position of a touch input of the touch-input marking apparatus 120a1 associated with the sequential number 1 is to be detected, the touch-input marking apparatus 120a2 associated with the sequential number 2 is deactivated by using a deactivation control signal. After the touch-input sensing apparatus 110a detects a resonance signal from the touch-input marking apparatus 120a1 associated with the sequential number 1, the touch-input marking apparatus 120a2 having the sequential number 2 may be activated again. The activation of the touch-input marking apparatus 120a2 having the sequential number 2 again may be performed immediately after the position of a touch input of the touch-input marking apparatus 120a1 having the sequential number 1 is detected or when the position of a touch input of the touch-input marking apparatus 120a2 associated with the sequential number 2 is to be detected.

According to the present exemplary embodiment, the resonance signal output unit 330 of the touch-input marking apparatus 120a may output a resonance signal only when the touch-input marking apparatus 120a is activated.

Figure 13:
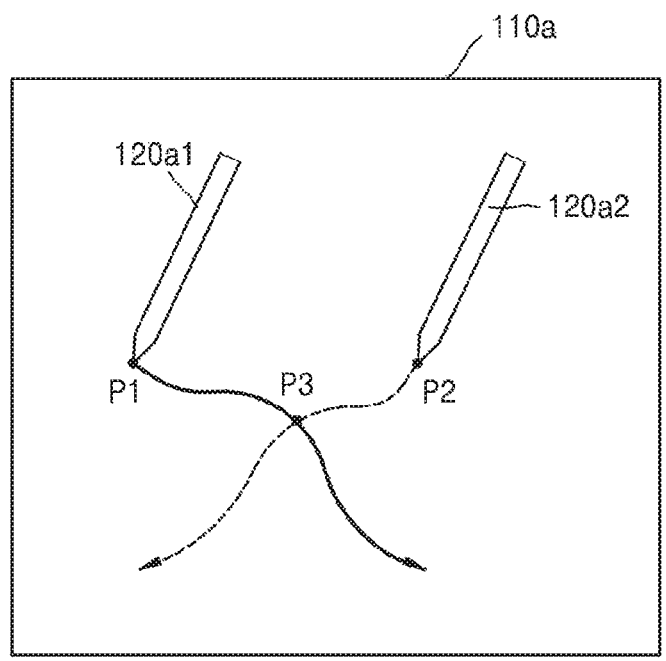
FIG. 13 illustrates a process of detecting positions of touch inputs according to another exemplary embodiment.

FIG. 13 illustrates a process of detecting positions of touch inputs according to another exemplary embodiment.

According to the present exemplary embodiment, the antenna unit 210 of the touch-input sensing apparatus 110a tracks positions of touch inputs from the touch-input marking apparatuses 120a1 and 120a2 and distinguishes the respective touch inputs of the touch-input marking apparatuses 120a1 and 120a2. For example, when a touch input from the touch-input marking apparatus 120a1 having the sequential number 1 is detected at a position P1, the touch input is tracked from the position P1 and the tracked touch input is recognized as a touch input of the touch-input marking apparatus 120a1 having the sequential number 1. Similarly, when a touch input from the touch-input marking apparatus 120a2 associated with the sequential number 2 is detected at a position P2, the touch input is tracked from the position P2 and the tracked touch input is recognized as a touch input of the touch-input marking apparatus 120a2 associated with the sequential number 2. When the tracked touch input of the touch-input marking apparatus 120a1 associated with the sequential number 1 and the touch input of the touch-input marking apparatus 120a2 associated with the sequential number 2 meet at a position P3 as illustrated in FIG. 13, the touch-input marking apparatuses 120a1 and 120a2 are detected again to determine whether the touch input at each position is a touch input from a particular one of the touch-input marking apparatuses 120a1 and 120a2, and the touch input is distinguished by tracking a touch input thereafter. According to the present exemplary embodiment, when the touch-input marking apparatuses 120a1 and 120a2 are in use, the process of detecting a touch input may be simplified because the touch-input sensing apparatus 110a detects the touch-input marking apparatuses 120a1 and 120a2 only when each of the touch-input marking apparatuses 120a1 and 120a2 is first detected and when paths of the touch inputs of the touch-input marking apparatuses 120a1 and 120a2 cross each other.

Figure 14:
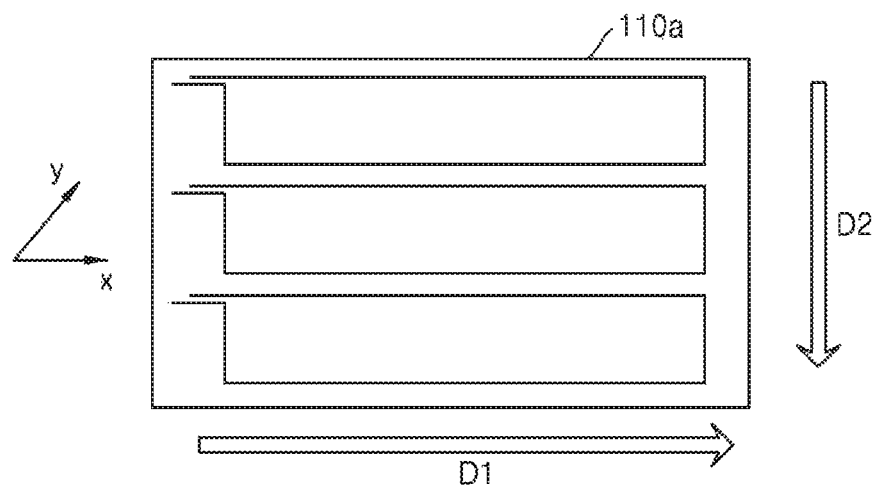
FIG. 14 illustrates a process of detecting touch inputs of the touch-input marking apparatus according to another exemplary embodiment.

FIG. 14 illustrates a process of detecting touch inputs of the touch-input marking apparatuses 120a1 and 120a2 according to another exemplary embodiment.

According to the present exemplary embodiment, when the touch-input marking apparatuses 120a1 and 120a2 are detected, a drive axis of the antenna unit 210 of the touch-input sensing apparatus 110a may be changed. When a touch-input position is detected by detecting a resonance signal from the touch-input marking apparatuses 120a1 and 120a2, the antenna unit 210 may be provided with an antenna to detect the resonance signal. When the touch-input marking apparatuses 120a1 and 120a2 are detected, the antenna unit 210 may change a drive axis of an antenna drive signal to drive the antenna. During transceiving using the antenna, as illustrated in FIG. 14, an antenna arranged lengthwise in an x-axis direction performs scanning in a y direction, that is, a direction D2, whereas an antenna arranged long in a y-axis direction performs scanning in an x direction, that is, a direction D1. However, for example, when the touch-input marking apparatuses 120a1 and 120a2 are detected while performing scanning of a touch input in the direction D2 using the antenna arranged in the x-axis direction D1, a scanning direction may be changed such that a touch input may be detected while performing scanning of a touch input in the direction D1 using the antenna arranged in the y-axis direction D2. As such, by changing the drive axis of the antenna drive signal, even when the touch-input marking apparatuses 120a1 and 120a2 are arranged linearly on one axis, the position of a touch input of each of the touch-input marking apparatuses 120a1 and 120a2 may be more accurately detected.

Figure 15:
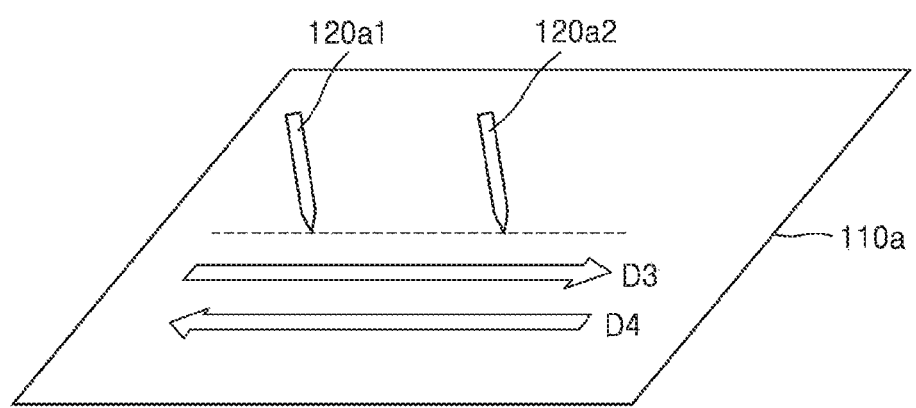
FIG. 15 illustrates a process of detecting touch inputs of the touch-input marking apparatuses according to another exemplary embodiment.

FIG. 15 illustrates a process of detecting touch inputs of the touch-input marking apparatuses 120a1 and 120a2 according to another exemplary embodiment.

According to the present exemplary embodiment, when the touch-input marking apparatuses 120a1 and 120a2 are detected, a drive sequence in the antenna unit 210 of the touch-input sensing apparatus 110a may be changed. When a touch input position is detected by detecting the resonance signals from the touch-input marking apparatuses 120a1 and 120a2, the antenna unit 210 may include a plurality of antennas provided in the antenna unit 210 to detect the resonance signals. When the touch-input marking apparatuses 120a1 and 120a2 are detected, the antenna unit 210 may change the drive sequence of the antennas. For example, when the touch-input marking apparatuses 120a1 and 120a2 are detected during driving of the antennas in a direction D3, the drive sequence of the antennas may be changed to a direction D4, which is opposite to the direction D3. When the touch-input marking apparatuses 120a1 and 120a2 interface with the touch-input sensing apparatus 110a, interference may occur between the resonance signals from the touch-input marking apparatuses 120a1 and 120a2. In this case, since responses of different shapes may be observed according to the drive sequence, accuracy of detecting a touch-input position may be increased by obtaining information in the opposite direction.

According to another exemplary embodiment, the touch-input sensing apparatus control unit 220 of the touch-input sensing apparatus 110a may allot a sequential number to the touch-input marking apparatus 120 by using a sequential number acceptance signal.

According to the present exemplary embodiment, the touch-input sensing apparatus control unit 220 detects a sequential number acceptance signal within a predetermined reference time after the sequential number signal is output. As the touch-input sensing apparatus control unit 220 detects the sequential number acceptance signal, it may be observed that a sequential number of the output sequential number signal is allotted to a new touch-input marking apparatus 120.

According to another exemplary embodiment, the sequential number acceptance signal may include information about a type of the touch-input marking apparatus 120. When a plurality of touch-input marking apparatuses are in use, feedback for the touch-input sensing apparatus 110a may differ according to the type of the respective touch-input marking apparatuses 120. For example, assuming that the touch-input marking apparatus 120 is defined by a red pen, a blue pen, and a yellow pen according to a type thereof, when a touch input from the touch-input marking apparatus 120 corresponding to the red pen is detected, the touch-input sensing apparatus 110a may draw a red line following a path of the touch input. In this case, the touch-input marking apparatus 120 may transfer to the touch-input sensing apparatus 110a the sequential number acceptance signal including information about the type of the touch-input marking apparatus 120, that is, the red pen, along with information about sequential number acceptance. The touch-input sensing apparatus 110a may immediately output a feedback corresponding to the touch-input marking apparatus 120 by using the information about the type of the touch-input marking apparatus 120 included in the sequential number acceptance signal.

Also the touch-input sensing apparatus control unit 220 outputs a response request signal including the sequential number information to the touch-input marking apparatus 120. According to the present exemplary embodiment, the touch-input sensing apparatus control unit 220 may generate and output a response request signal only related to the sequential number of which the sequential number acceptance signal is detected. Also, in order to detect the position of a touch input of each of the touch-input marking apparatuses 120, the touch-input sensing apparatus control unit 220 may generate and output response request signals sequentially for the respective sequential numbers, and such a process may be repeated. The touch-input sensing apparatus control unit 220 in response to the response request signal receives and detects a response signal that is generated and output by the touch-input marking apparatus 120.

Figure 16:
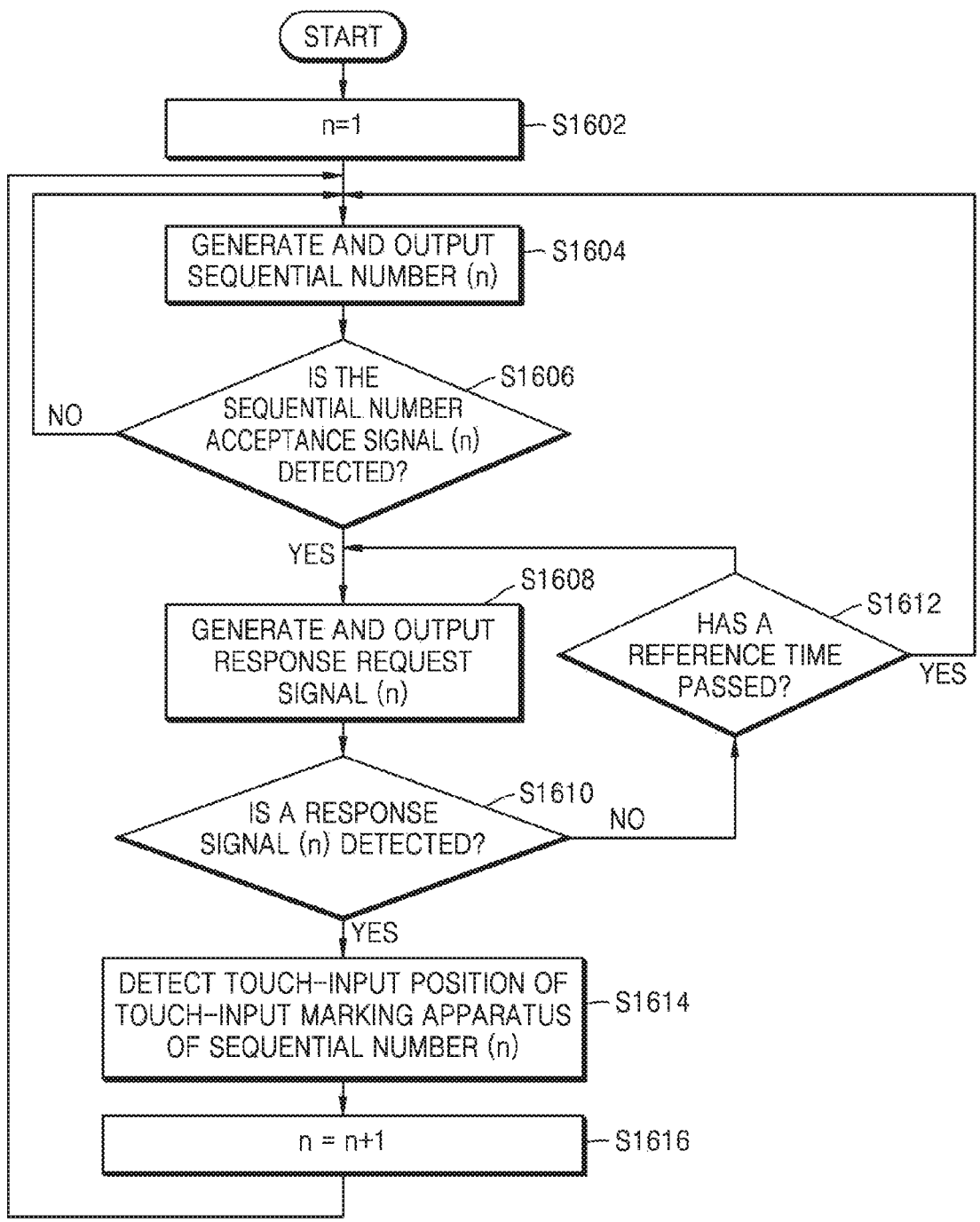
FIG. 16 is a flowchart for explaining a method of detecting a touch input according to another exemplary embodiment.

FIG. 16 is a flowchart for explaining a method of detecting a touch input according to another exemplary embodiment.

First, an initial value of a sequential number of a sequential number signal is set (S1602). For example, the initial value of a sequential number is set to 1 and the sequential number increases by 1 to be sequentially allotted.

Next, the touch-input sensing apparatus 110a generates and outputs a sequential number signal (S1604). After the sequential number signal is output, the touch-input sensing apparatus 110a detects a sequential number acceptance signal of the corresponding sequential number within a predetermined time (S1606). If the sequential number acceptance signal is not detected with a predetermined time, the sequential number signal of the corresponding sequential number is generated and output again (S1604).

When the sequential number acceptance signal is detected (S1606), the touch-input sensing apparatus 110a generates and outputs a response request signal having the corresponding sequential number (S1608) and detects a response signal related to the corresponding sequential number (S1610). When the response signal is detected, the touch-input sensing apparatus 110a detects a position of a touch input from a touch-input marking apparatus 120b having the corresponding sequential number (S1614).

Also, when the sequential number acceptance signal is detected, the touch-input sensing apparatus 110a increases the sequential number (S1616) and generates and outputs a sequential number signal having a next sequential number (S1604).

According to another exemplary embodiment, when the response signal is not detected within a predetermined reference time (S1612), information about the touch-input marking apparatus 120b allotted to the corresponding sequential number is erased, and it may be set such that no touch-input marking apparatus 120b is allotted to the corresponding sequential number. In this case, an operation of generating and outputting a sequential number signal of a corresponding sequential number may be performed (S1604).

According to another exemplary embodiment, when a sequential number signal is stored in the storage unit 310, the touch-input marking apparatus control unit 320 outputs a sequential number acceptance signal. The sequential number acceptance signal may be transmitted to the touch-input sensing apparatus 110a.

According to an exemplary embodiment, the sequential number acceptance signal may include information about the type of the corresponding touch-input marking apparatus 120. When the sequential number signal is already stored in the storage unit 310, the touch-input marking apparatus control unit 320 of the touch-input marking apparatus 120a may not output the sequential number acceptance signal even when a sequential number signal of a next sequential number is input.

Also, the touch-input marking apparatus control unit 320 may output a response signal in response to the response request signal transmitted by the touch-input sensing apparatus 110a. The touch-input marking apparatus control unit 320 may output or may not output a response signal according to a combination of the sequential number signal stored in the storage unit 310 and the response request signal.

According to another exemplary embodiment, a touch-input sensing apparatus 110a may receive information about a pen pressure of the touch-input marking apparatus 120a or additional information from the touch-input marking apparatus 120a.

According to the present exemplary embodiment, the touch-input sensing apparatus control unit 220 generates and outputs a pen pressure request signal to request information about a pen pressure of the touch-input marking apparatus 120 having a particular sequential number. According to an exemplary embodiment, the touch-input sensing apparatus control unit 220 may output a pen pressure request signal to the touch-input marking apparatus 120 from which a response signal is detected.

Also, the touch-input sensing apparatus control unit 220 receives the pen pressure signal output from the touch-input marking apparatus 120 in response to the pen pressure request signal, and acquires information about a pen pressure of the touch-input marking apparatus 120.

The touch-input sensing apparatus 110a may receive information about a pen pressure from the touch-input marking apparatus 120b. According to the present exemplary embodiment, information about a pen pressure of a plurality of touch-input marking apparatuses 120b may be acquired by obtaining information about the pen pressures of the touch-input marking apparatuses associated with each of the sequential numbers.

Also, the touch-input sensing apparatus control unit 220 generates and outputs an additional information request signal to request additional information of the touch-input marking apparatus 120b having a particular sequential number. According to an exemplary embodiment, the touch-input sensing apparatus control unit 220 may output an additional information request signal with respect to the touch-input marking apparatus 120b from which a response signal is detected. The additional information may include, for example, a serial number, a manufacturer, or property information of the touch-input marking apparatus 120b. The touch-input sensing apparatus control unit 220 receives the additional information signal output from the touch-input marking apparatus 120b in response to the additional information request signal, and acquires additional information of the touch-input marking apparatus 120b.

According to an exemplary embodiment, the touch-input marking apparatus 120b may include a button that is operable by a user and the additional information may include information about a state of the button. When the touch-input marking apparatus 120b includes a button, the user may change a state of the touch-input marking apparatus 120b or control a function of the touch-input marking apparatus 120b, by using the button. For example, the user may change the state of the touch-input marking apparatus 120b to red, blue, or black by using the button of the touch-input marking apparatus 120b. In another example, the user may change the function of the touch-input marking apparatus 120b to a pen or an eraser by using the button of the touch-input marking apparatus 120b. The touch-input sensing apparatus control unit 220 may receive the information about a state of the button in the form of additional information and operate differently with respect to an input through the touch-input marking apparatus 120b according to the information about a state of the button. For example, when the state of the button of the touch-input marking apparatus 120b corresponds to red, a red line may be drawn at a position where a touch input using the corresponding touch-input marking apparatus 120b is detected. In another example, when the state of the button of the touch-input marking apparatus 120b corresponds to a function of an eraser, an object already marked at a position where a touch input using the corresponding touch-input marking apparatus 120b is detected, may be erased to return to original the background color.

According to an exemplary embodiment, the pen pressure request signal and the additional information request signal may be transmitted to the touch-input marking apparatus 120b through the antenna unit 210, and the pen pressure signal and the additional information signal may be received from the touch-input marking apparatus 120b through the antenna unit 210 differently.

Figure 17:
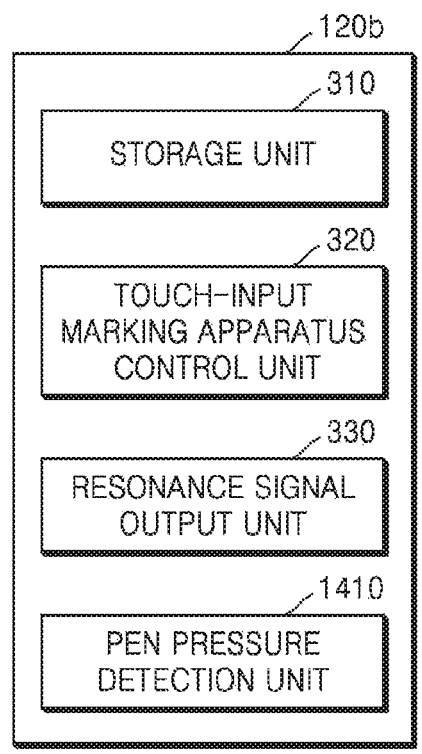
FIG. 17 illustrates a structure of the touch-input marking apparatus according to another exemplary embodiment.

FIG. 17 illustrates a structure of the touch-input marking apparatus 120b according to another exemplary embodiment. According to the present exemplary embodiment, the touch-input marking apparatus 120b may include the storage unit 310, the touch-input marking apparatus control unit 320, the resonance signal output unit 330, and a pen pressure detection unit 1410 ("pen pressure detector").

The storage unit 310 stores a sequential number signal. The storage unit 310 may be embodied by a predetermined storage medium for storing data. According to the present exemplary embodiment, the storage unit 310 stores additional information with respect to the corresponding touch-input marking apparatus 120b. The additional information may include, for example, a serial number, a manufacturer, or property information of the touch-input marking apparatus 120b.

The touch-input marking apparatus control unit 320 controls an overall operation of the touch-input marking apparatus 120a. The touch-input marking apparatus control unit 320 outputs a response signal in response to the response request signal transmitted by the touch-input sensing apparatus 110a.

Also, according to the present exemplary embodiment, the touch-input marking apparatus control unit 320 outputs the additional information stored in the storage unit 310 in response to the additional information request signal from the touch-input sensing apparatus 110a. The additional information request signal may include information about a sequential number, and the touch-input marking apparatus control unit 320 may output the additional information only when the sequential number of the additional information request signal matches the sequential number stored in the storage unit 310.

According to an exemplary embodiment, the transmitting of the signal output from the touch-input marking apparatus control unit 320 and the receiving of the signal transmitted by the touch-input sensing apparatus 110a may be performed by using the communication module provided in the touch-input marking apparatus 120b or the antenna provided in the resonance signal output unit 330.

The resonance signal output unit 330 may receive resonance energy generated by the touch-input sensing apparatus 110a and output a resonance signal. The touch-input sensing apparatus 110a may detect the resonance signal and detect a touch-input position of the touch-input marking apparatus 120a.

The pen pressure detection unit 1410 may measure a pen pressure of the touch-input marking apparatus 120b. The pen pressure indicates an amount of pressure generated with the touch-input marking apparatus 120b while pressing the touch-input sensing apparatus 110a. The pen pressure detection unit 1410 may include a pressure sensor that detects, for example, a pressure applied to a tip end of the touch-input marking apparatus 120b contacting the touch-input sensing apparatus 110a.

The touch-input marking apparatus control unit 320, in response to the pen pressure request signal transmitted by the touch-input sensing apparatus 110a, generates and outputs a pen pressure signal including the information about a pen pressure detected by the pen pressure detection unit 1410. The pen pressure request signal may include information related to a sequential number, and the touch-input marking apparatus control unit 320 may generate and output the pen pressure signal only when the sequential number of the pen pressure request signal matches the sequential number stored in the storage unit 310.

Figure 18:
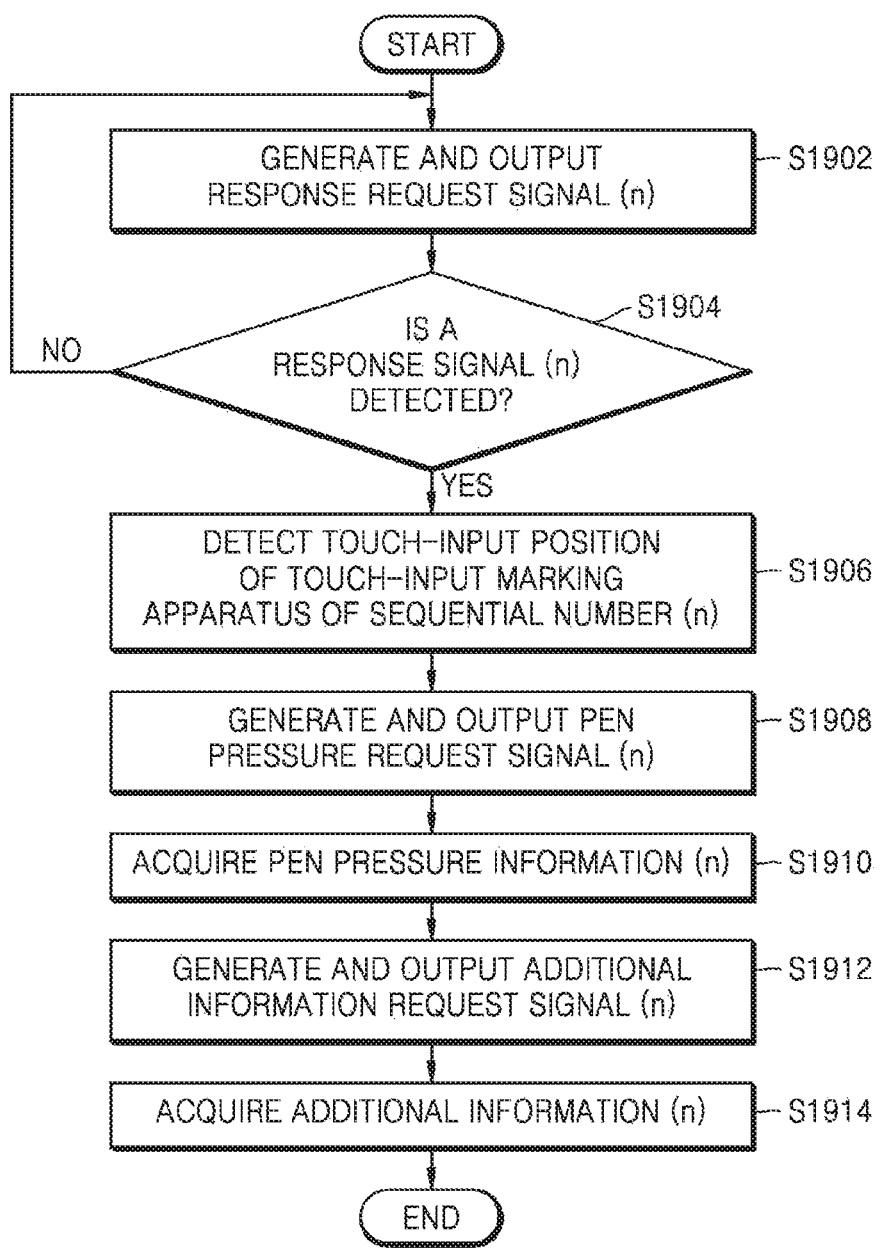
FIG. 18 is a flowchart for explaining a method of detecting a touch input according to another exemplary embodiment.

FIG. 18 is a flowchart for explaining a method of detecting a touch input according to another exemplary embodiment.

After a sequential number is allotted to the touch-input sensing apparatus 110a, the touch-input sensing apparatus 110a generates and outputs a response request signal (S1902). When a response signal to the response request signal is detected (S1904), the touch-input sensing apparatus 110a detects a touch-input position of the touch-input marking apparatus 120b of the corresponding sequential number (S1906).

The touch-input sensing apparatus 110a generates and outputs a pen pressure request signal based on the corresponding sequential number (S1908), detects a pen pressure signal, and acquires information about a pen pressure of the touch-input marking apparatus 120b having the corresponding sequential number (S1910).

Also, the touch-input sensing apparatus 110a generates and outputs an additional information request signal with respect to the corresponding sequential number (S1912), detects an additional information signal, and acquires additional information of the touch-input marking apparatus 120b having the corresponding sequential number (S1914).

The sequence of the processes of acquiring the information about a pen pressure S1908 and S1910 and the processes of acquiring the additional information S1912 and S1914 are not limited to the sequence illustrated in FIG. 18 and a variety of combinations thereof are available.

As described above, according to the one or more of the above exemplary embodiments of the present inventive concept, a touch-input sensing apparatus, which may receive touch inputs from a plurality of touch-input marking apparatuses, and a touch-input detection method may be provided.

Also, according to the above-described exemplary embodiments, a touch-input marking apparatus may have a touch input that crosses paths with another touch-input marking apparatus.

In addition, other exemplary embodiments of the present inventive concept can also be implemented through computer readable code/instructions in/on a medium, e.g., a computer readable medium, to control at least one processing element to implement any above described embodiment. The medium can correspond to any medium/media permitting the storage and/or transmission of the computer readable code.

It should be understood that the exemplary embodiments described herein should be considered in a descriptive sense only and not for purposes of limitation. Descriptions of features or aspects within each embodiment should typically be considered as available for other similar features or aspects in other exemplary embodiments.

While one or more exemplary embodiments of the present inventive concept have been described with reference to the figures, it will be understood by those of ordinary skill in the art that various changes in form and details may be made therein without departing from the spirit and scope of the present inventive concept as defined by the following claims.

What is claimed is:

1. A method of detecting inputs of marking devices by an electronic device, method comprising:
generating a first number signal and a second number signal, wherein the first number signal and the second number signal includes first number information and second number information, respectively;
outputting the first number signal and the second number signal to a first marking device and a second marking device, respectively, wherein the first marking device and the second marking device are for indicating a position on the electronic device;
receiving response signals from the first marking device and the second marking device, wherein the response signals includes first response signal from the first marking device and a second response signal from the second marking device, and the response signals are generated based on response request signals from the electronic device;
identifying a location of the first marking device based on the first response signal from the first marking device and a location of the second marking device based on the second response signal from the second marking device; and
displaying the locations of the first marking device and the second marking device on a display of the electronic device, wherein the identifying the location of the first marking device and the location of the second marking device comprises identifying the location of the first marking device based on a relative amplitude of the first response signal received through a plurality of antennas installed in the electronic device and the location of the second marking device based on a relative amplitude of the second response signal received through the plurality of antennas installed in the electronic device.

2. The method of claim 1, further comprising receiving number acceptance signals from the first marking device and the second marking device, wherein the number acceptance signals comprises a first number acceptance signal from the first marking device and a second number acceptance signal from the second marking device.

3. The method of claim 1, wherein the first marking device corresponds to a first color, the second marking device corresponds to a second color.

4. The method of claim 3, wherein the displaying the locations of the first marking device and the second marking device comprises displaying the location of the first marking device as the first color, and displaying the location of the second marking device as the second color.

5. The method of claim 1, wherein the displaying the locations of the first marking device and the second marking device comprises displaying the location of the first marking device and the location of the second marking device, simultaneously.

6. The method of claim 1, further comprising receiving information of a pen pressure of the first marking device from at least one of the first marking device and the second marking device.

7. The method of claim 6, further comprising transmitting a pen pressure request signal to at least one of the first marking device and the second marking device.

8. The method of claim 1, further comprising receiving additional information from at least one of the first marking device and the second marking device.

9. The method of claim 8, further comprising transmitting an additional information request signal to at least one of the first marking device and the second marking device.

10. The method of claim 8, wherein the additional information comprises at least one of a serial number, a manufacturer, and property information.

11. The method of claim 1, wherein the first response signal comprises the first number information, and the second response signal comprises the second number information.

12. The method of claim 1, wherein the response request signals from the electronic device are associated with one of the first number information or the second number information.

13. An electronic device for detecting inputs of marking devices, the electronic device comprising:
  a plurality of antennas configured to transmit and receive a signal;
  a controller configured to:
    generate a first number signal and a second number signal, wherein the first number signal and the second number signal includes first number information and second number information, respectively,
    output the first number signal and the second number signal, to a first marking device and a second marking device, respectively, wherein the first marking device and the second marking device are for indicating a position on the electronic device,
    receive response signals from the first marking device and the second marking device, wherein the response signals includes first response signal from the first marking device and a second response signal from the second marking device, and the response signals are generated based on response request signals from the electronic device,
    identify a location of the first marking device based on the first response signal from the first marking device and a location of the second marking device based on the second response signal from the second marking device, and
  a display configured to display the locations of the first marking device and the second marking device,
  wherein the controller is configured to identify the location of the first marking device based on a relative amplitude of the first response signal received through the plurality of antennas and the location of the second marking device based on a relative amplitude of the second response signal received through the plurality of antennas.

14. The electronic device of claim 13, wherein the controller is further configured to receive number acceptance signals from the first marking device and the second marking device, wherein the number acceptance signals comprises a first number acceptance signal from the first marking device and a second number acceptance signal from the second marking device.

15. The electronic device of claim 13, wherein the first marking device corresponds to a first color, the second marking device corresponds to a second color.

16. The electronic device of claim 15, wherein the controller is further configured to control the display to display the location of the first marking device as the first color, and display the location of the second marking device as the second color.

17. The electronic device of claim 13, wherein the controller is further configured to control the display to display the location of the first marking device and the location of the second marking device, simultaneously.

18. The electronic device of claim 13, wherein the controller is further configured to receive information of a pen pressure of the first marking device from at least one of the first marking device and the second marking device.

19. The electronic device of claim 18, wherein the controller is further configured to transmit a pen pressure request signal to at least one of the first marking device and the second marking device.

20. The electronic device of claim 13, wherein the controller is further configured to receive additional information from at least one of the first marking device and the second marking device.

21. The electronic device of claim 20, wherein the controller is further configured to transmit an additional information request signal to at least one of the first marking device and the second marking device.

22. The electronic device of claim 20, wherein the additional information comprises at least one of a serial number, a manufacturer, and property information.

23. The electronic device of claim 13, wherein the first response signal comprises the first number information, and the second response signal comprises the second number information.

24. The electronic device of claim 13, wherein the response request signals from the electronic device are associated with one of the first number information or the second number information.

* * * * *